(12) United States Patent
Hosaka et al.

(10) Patent No.: US 10,954,314 B2
(45) Date of Patent: Mar. 23, 2021

(54) METHOD OF DISINTEGRATING PULP FOR USE IN CELLULOSE ACETATE PRODUCTION AND METHOD OF PRODUCING CELLULOSE ACETATE

(71) Applicant: DAICEL CORPORATION, Osaka (JP)

(72) Inventors: Mitsuteru Hosaka, Himeji (JP); Toshinori Okano, Himeji (JP); Yuji Ida, Himeji (JP)

(73) Assignee: DAICEL CORPORATION, Osaka (JP)

( * ) Notice: Subject to any disclaimer, the term of this patent is extended or adjusted under 35 U.S.C. 154(b) by 58 days.

(21) Appl. No.: 15/323,928

(22) PCT Filed: Jul. 14, 2014

(86) PCT No.: PCT/JP2014/003720
§ 371 (c)(1),
(2) Date: Jan. 4, 2017

(87) PCT Pub. No.: WO2016/009461
PCT Pub. Date: Jan. 21, 2016

(65) Prior Publication Data
US 2017/0145118 A1  May 25, 2017

(51) Int. Cl.
*C08B 3/06* (2006.01)
*B02C 19/06* (2006.01)
*B02C 7/06* (2006.01)

(52) U.S. Cl.
CPC ............. *C08B 3/06* (2013.01); *B02C 7/06* (2013.01); *B02C 19/06* (2013.01); *B02C 19/061* (2013.01)

(58) Field of Classification Search
CPC .............. C08B 3/06; B02C 7/06; B02C 19/06
USPC ................... 536/77, 124, 69, 70, 71
See application file for complete search history.

(56) References Cited

U.S. PATENT DOCUMENTS

| | | | |
|---|---|---|---|
| 2,105,498 A | 1/1938 | Parrett et al. | |
| 2,646,429 A * | 7/1953 | Malm | C08B 1/02 536/68 |
| 3,753,749 A * | 8/1973 | Nutt | C04B 18/241 106/731 |
| 3,767,642 A | 10/1973 | Campbell et al. | |
| 5,036,900 A | 8/1991 | Burley et al. | |
| 5,977,346 A * | 11/1999 | Saka | C08B 3/06 536/63 |
| 8,796,362 B2 * | 8/2014 | Meldal | C08B 3/08 428/35.7 |
| 2004/0041042 A1 * | 3/2004 | Samuels | B29B 9/02 241/29 |
| 2012/0135170 A1 | 5/2012 | Meldal et al. | |

FOREIGN PATENT DOCUMENTS

| | | | |
|---|---|---|---|
| CN | 102317365 A | | 1/2012 |
| EP | 0351226 A2 | | 1/1990 |
| GB | 2257142 A | | 1/1993 |
| JP | 2-91101 A | | 3/1990 |
| JP | 3-197501 A | | 8/1991 |
| JP | 2823944 B2 | | 11/1998 |
| JP | 2001-29817 A | | 2/2001 |
| JP | 2009-11967 A | | 1/2009 |
| JP | 201094574 A | * | 4/2010 |
| JP | 2011-190322 A | | 9/2011 |
| WO | WO 93/25584 A2 | | 12/1993 |

OTHER PUBLICATIONS

International Search Report for PCT/JP2014/003720 (PCT/ISA/210) dated Sep. 16, 2014.
Written Opinion of the International Searching Authority for PCT/JP2014/003720 (PCT/ISA/237) dated Sep. 16, 2014.
Extended European Search Report for European Application No. 14897640.0, dated Aug. 11, 2017.

* cited by examiner

*Primary Examiner* — Eric Olson
*Assistant Examiner* — Everett White
(74) *Attorney, Agent, or Firm* — Birch, Stewart, Kolasch & Birch, LLP

(57) ABSTRACT

A method of disintegrating pulp for use in cellulose acetate production includes: a primary disintegration step of disintegrating a pulp sheet into pulp pieces having an average area of not more than 45 cm$^2$; and a secondary disintegration step of disintegrating the pulp pieces with an impact shock exerted by a jet mill (20). The jet mill (20) includes: a cylindrical casing (21) provided with an inlet (21*d*) and an outlet (21*e*); and a rotor (25) including a plurality of blades (25*a*) provided on its outer peripheral portion, the plurality of blades (25*a*) facing an inner peripheral surface of the casing (21).

2 Claims, 3 Drawing Sheets

METHOD OF DISINTEGRATING PULP FOR USE IN CELLULOSE ACETATE PRODUCTION AND METHOD OF PRODUCING CELLULOSE ACETATE

TECHNICAL FIELD

The present invention relates to a method of disintegrating pulp for use as a raw material for producing cellulose acetate, and also relates to a method of producing cellulose acetate by using the disintegrated pulp as a raw material.

BACKGROUND ART

In the production of cellulose acetate used for a cigarette filter tow or the like, first, pulp that is used as a raw material for producing the cellulose acetate is disintegrated. The term "disintegrate" herein means to crush the pulp into fine pieces. Pulp available for use in cellulose acetate production is, for example, wood pulp obtained from wood or linter pulp obtained from cotton linters. These available pulps are sheet-shaped. Such a pulp sheet is disintegrated to obtain a large number of pulp pieces, which are then subjected to a pretreatment in which acetic acid is added to the pulp pieces. Acetic acid that has been cooled down, acetic anhydride, and a sulfuric acid catalyst (mixed acid) are added to the pretreated pulp pieces, and the resulting mixture is subjected to acetylation by using a kneader or the like while performing temperature control by an external jacket or the like. After fully-trisubstituted cellulose acetate (primary cellulose acetate) is obtained by the acetylation, the obtained viscous cellulose acetate is charged into an ageing tank, and a neutralizer such as an aqueous solution of magnesium acetate is added thereto, such that the sulfuric acid is neutralized (fully or partly neutralized) by magnesium, and such that the acetic anhydride is quenched and hydrolyzed by water contained in the aqueous solution of magnesium acetate. Consequently, a cellulose acetate (secondary cellulose acetate) dope with a desirable degree of substitution is obtained. A large amount of water is added to the dope, or the dope is extruded into a large amount of water, such that the cellulose acetate is sedimented in the water. The cellulose acetate sediment is then subjected to solid-liquid separation, washed, and dried. As a result, a cellulose acetate product is obtained.

As described above, the reaction of the cellulose acetate is a solid-liquid reaction between the solid pulp and the liquid mixed acid. Therefore, in order to realize a uniform reaction, it is important for the pulp to be in a properly disintegrated state before undergoing the solid-liquid reaction.

A method adopted for disintegrating the pulp may be a wet disintegration method or a dry disintegration method. In a wet disintegration method, a pulp sheet is disintegrated while adding water or steam thereto (see Patent Literatures 1 and 2, for example). In Patent Literature 1, activation by steam and high-shear stirring in a reactor are performed. However, in this method, the reactor needs to be additionally installed, and also, a great loss of acetic anhydride is caused by water that enters the system. In Patent Literature 2, wood pulp with an α-cellulose content of 92 to 93% is utilized. The wood pulp is disaggregated in an aqueous solution of diluted acetic acid, and thereby slurry is formed. Then, the slurry is repeatedly subjected to dehydration and acetic acid substitution. That is, Patent Literature 2 adopts so-called slurry pretreatment. However, in this method, a large amount of water-containing acetic acid is produced as a byproduct. For this reason, a large amount of energy is required for concentrating and recovering acetic acid, which is unfavorable from economical and environmental viewpoints. Therefore, adopting not a wet disintegration method but a dry disintegration method is practical for disintegrating the pulp for use as a raw material for producing cellulose acetate.

In a dry disintegration method, a pulp sheet in a dry state is directly disintegrated (see Patent Literatures 3 and 4, for example). Patent Literature 3 discloses that pulp that has been roughly disintegrated by a disc refiner having pyramid teeth is more finely disintegrated by a disc refiner having linear teeth, and thereby favorable cellulose acetate is obtained. Patent Literature 4 discloses the use of a turbo mill that includes: a cylindrical outer casing with a liner attached to its inner wall; a plurality of discs that rotate about the center line of the outer casing at high speed; and a large number of blades mounted radially with respect to the center line such that each blade is positioned between adjoining discs. In Patent Literature 4, an object to be disintegrated is fed into the outer casing, and the fed object is exposed to three kinds of impact shocks that are caused by: hitting by the blades; collision with the liner; and high-frequency pressure oscillation generated as a result of the action of the high-speed rotating discs, the blades, and the liner. Consequently, the fed object is disintegrated.

CITATION LIST

Patent Literature

PTL 1: WO 9325584
PTL 2: U.S. Pat. No. 3,767,642
PTL 3: Japanese Laid-Open Patent Application Publication No. 2001-29817
PTL 4: Japanese Patent Publication No. 2823944

SUMMARY OF INVENTION

Technical Problem

However, in the disintegration method of Patent Literature 3, in both the rough disintegration step and the fine disintegration step, the pulp is disintegrated by utilizing the shear force of the disc refiner. Accordingly, there is a case where heat that is generated due to the shear friction causes degradation of the pulp. In particular, when pulp with a long fiber length is used, the residence time of the pulp in the process of the fine disintegration is prolonged. As a result, scorching of the pulp tends to occur, which causes increase in the amount of unreacted components during the production of cellulose acetate. Consequently, the degree of filtration of the cellulose acetate tends to degrade. Cellulose acetate containing a large amount of unreacted components negatively affects the productivity and product quality in the process of dissolution and filtration. Therefore, such cellulose acetate is unusable for certain applications requiring high quality, for example, unusable for optical films.

Patent Literature 4 discloses that even when a hard low-grade pulp sheet having a high sheet density is used as a cellulose raw material, cellulose acetate with excellent transparency, filterability, and spinnability can be produced by disintegrating the pulp with a turbo mill. However, if the pulp is, for example, unevenly distributed within the turbo mill, it is considered that the pulp is disintegrated less unevenly. Certain applications require cellulose acetate with higher quality. Therefore, also in the case of using a turbo mill, it is required to further reduce the unreacted components.

In view of the above, an objective of the present invention is to reduce the unreacted components during the production of cellulose acetate by adopting a suitable pulp disintegration method, and thereby reduce the degree of filtration of the cellulose acetate.

Solution to Problem

A method of disintegrating pulp for use in cellulose acetate production according to one aspect of the present invention includes: a primary disintegration step of disintegrating a pulp sheet into pulp pieces having an average area of not more than 45 $cm^2$; and a secondary disintegration step of disintegrating the pulp pieces with an impact shock exerted by a jet mill. The jet mill includes: a cylindrical casing provided with an inlet and an outlet; and a rotor including a plurality of blades provided on its outer peripheral portion, the plurality of blades facing an inner peripheral surface of the casing.

According to the above method, since the pulp is disintegrated in the secondary disintegration by utilizing the impact shock exerted by the jet mill, degradation of the pulp due to heat can be suppressed. In addition, in advance of the secondary disintegration, the pulp sheet is disintegrated in the primary disintegration into pulp pieces having an average area of not more than 45 $cm^2$. As a result, problems such as uneven distribution of the pulp within the jet mill can be prevented satisfactorily, and thereby the pulp can be disintegrated evenly. Thus, the pulp can be disintegrated evenly while suppressing degradation of the pulp. This makes it possible to reduce unreacted components during the production of cellulose acetate using the pulp as a raw material, and thereby reduce the degree of filtration of the cellulose acetate.

Advantageous Effects of Invention

As is clear from the above description, according to the present invention, pulp can be disintegrated satisfactorily. Therefore, by using the disintegrated pulp as a raw material, high-quality cellulose acetate with reduced unreacted components can be obtained.

DESCRIPTION OF EMBODIMENTS

Hereinafter, one embodiment of the present invention is described with reference to the drawings.

In the present embodiment, primary disintegration is performed, and then secondary disintegration is performed. In the primary disintegration, a disc refiner 10, which is a mechanical disintegrator, is used to disintegrate a pulp sheet into pulp pieces having a predetermined average area. In the secondary disintegration, a jet mill 20 is used to further disintegrate the pulp pieces. In this manner, powdery pulp for use as a raw material for producing cellulose acetate is prepared.

Figure 1:
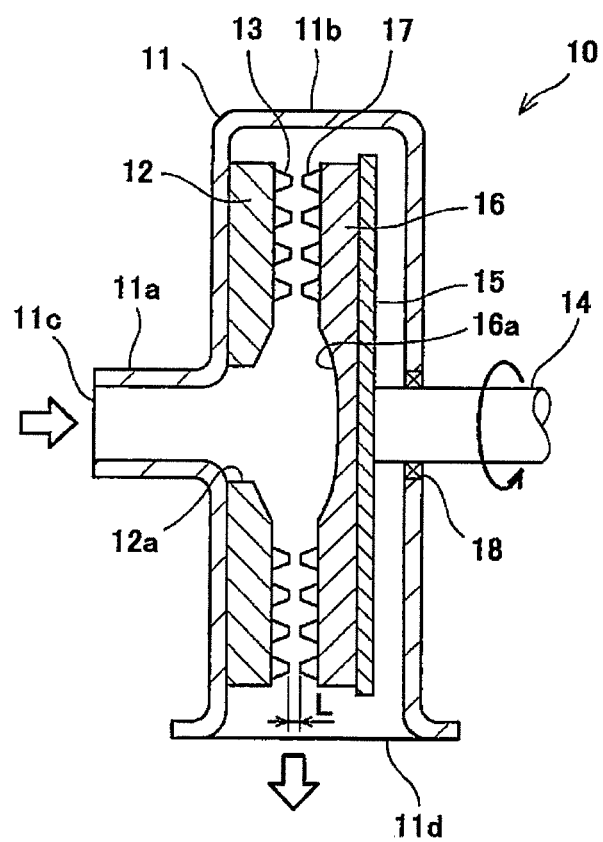
FIG. 1 is a sectional view of a disc refiner used in primary disintegration for disintegrating pulp according to one embodiment.

FIG. 1 is a sectional view of the disc refiner 10 used in the primary disintegration for disintegrating pulp according to the present embodiment. As shown in FIG. 1, the disc refiner 10 includes a casing 11. The casing 11 includes: a tubular introducing part 11a provided with an inlet 11c; and a disc housing 11b connected to the introducing part 11a and having a greater diameter than that of the introducing part 11a. The disc housing 11b accommodates a fixed disc 12 and a rotary disc 16, such that the fixed disc 12 and the rotary disc 16 face each other. The fixed disc 12 is fixed to the inner surface of the disc housing 11b. A through-hole 12a, which is in communication with an internal passage of the introducing part 11a, is formed in the fixed disc 12 such that the fixed disc 12 is annular plate-shaped. The rotary disc 16 is fixed to a rotary base plate 15, which is spaced apart from the disc housing 11b and fixed to a rotary shaft 14. The disc housing 11b is provided with an outlet 11d, which is positioned outwardly from the fixed disc 12 and the rotary disc 16 in the radial direction.

The rotary disc 16 is discoid, and has a recessed surface 16a, which is formed at a portion facing the through-hole 12a of the fixed disc 12. The recessed surface 16a is recessed in a direction away from the through-hole 12a, and is arc-shaped when seen in a sectional view. The rotary shaft 14 is rotatably supported by the casing 11 via a bearing 18, and is driven by a driving source (not shown) to rotate. A plurality of teeth 13 protrude from a surface of the fixed disc 12, and a plurality of teeth 17 protrude from a surface of the rotary disc 16. These surfaces face each other, and the teeth 13 and the teeth 17 face each other with a predetermined clearance L formed between them. In the present embodiment, the teeth 13 and 17 are pyramid teeth, each having a pyramid shape. It should be noted that the shape of the teeth 13 and 17 is not limited to a pyramid shape. Alternatively, the teeth 13 and 17 may be, for example, linear teeth extending radially in the radial direction. In the above-described configuration, only one of the two facing discs 12 and 16 is configured to rotate. However, the configuration of these discs is not thus limited. Alternatively, both the discs 12 and 16 may be configured to rotate in reverse directions to each other.

Figure 2:
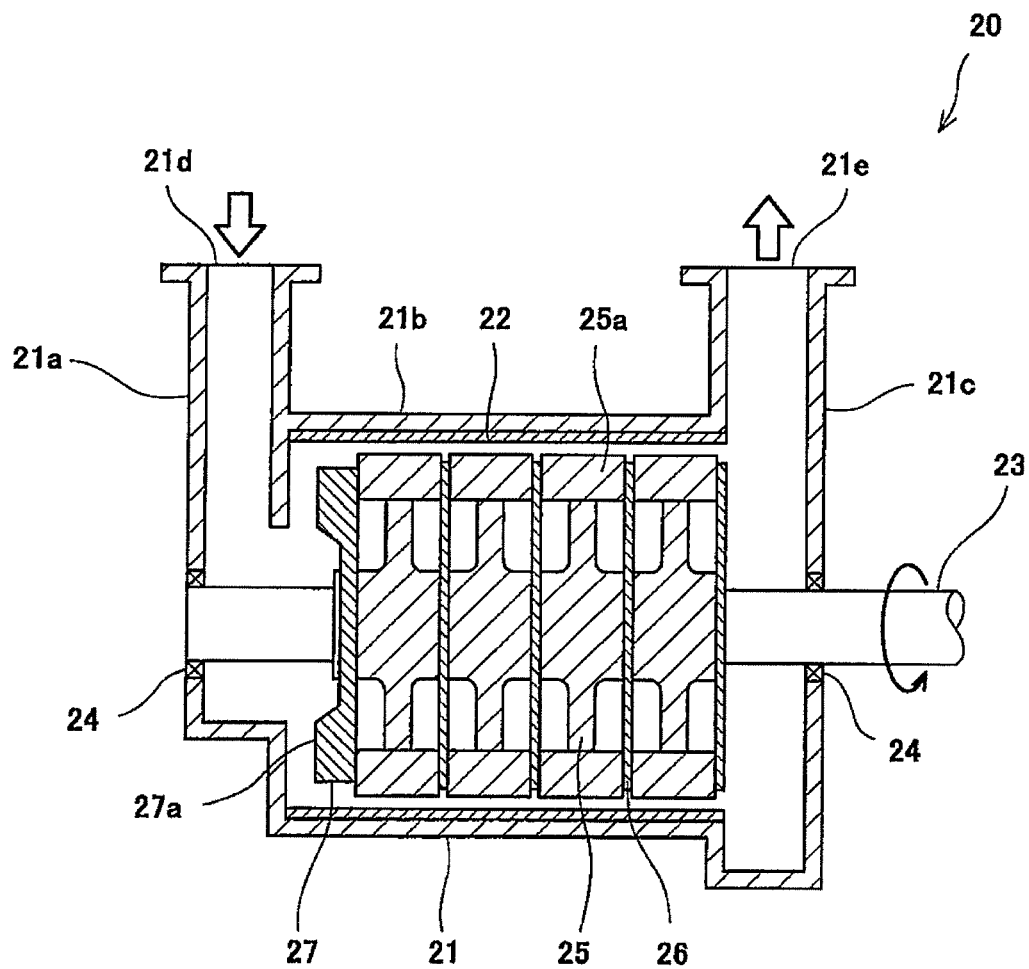
FIG. 2 is a sectional view of a jet mill used in secondary disintegration for disintegrating pulp according to the embodiment.

FIG. 2 is a sectional view of the jet mill 20 used in the secondary disintegration for disintegrating pulp according to the present embodiment. As shown in FIG. 2, the jet mill 20 includes a casing 21. The casing 21 includes: an introducing part 21a provided with an inlet 21d; a cylindrical rotor housing 21b connected to the introducing part 21a; and a leading-out part 21c, which is connected to the rotor housing 21b at the opposite side to the introducing part 21a and which is provided with an outlet 21e. A liner 22 is attached to the inner peripheral surface of the rotor housing 21b. A large number of grooves are formed in the liner 22. The grooves are spaced apart from one another in the circumferential direction, and extend in the direction of the rotational axis. The rotor housing 21b accommodates rotors 25 fixed to a rotary shaft 23. The rotary shaft 23 is rotatably supported by the casing 21 via a bearing 24, and is driven by a driving source (not shown) to rotate.

Each rotor 25 includes a plurality of blades 25a provided on its outer peripheral portion. The plurality of blades 25a are arranged such that the blades 25a are spaced apart from each other in the circumferential direction of the rotor 25 and extend radially when seen from the rotational axis. Discoid partition plates 26 are provided such that each partition plate 26 is positioned between adjoining rotors 25. The blades 25a are closer to the liner 22 than the partition plates 26 are. A discoid distributor 27 fixed to the rotary shaft 23 is disposed on the introducing part 21a side of the rotor 25 that is the closest rotor to the introducing part 21a among the plurality of rotors 25. The distributor 27 is provided with vanes 27a, which radially extend when seen from the rotational axis and which protrude toward the introducing part 21a. The rotors 25 and the distributor 27 face the liner 22 in the radial direction. It should be noted that the distributor 27 and/or the liner 22 are not essential components, and may be eliminated.

Next, steps of disintegrating a pulp sheet are described.

First, the pulp sheet is disintegrated by the disc refiner 10 into pulp pieces having a predetermined average area (primary disintegration). Specifically, while the rotary shaft 14 is being driven to rotate, the pulp sheet is continuously fed into the inlet 11c of the disc refiner 10. As a result, the pulp sheet is led to a gap between the teeth 13 of the fixed disc 12 and the teeth 17 of the rotary disc 16 owing to centrifugal force generated by the rotation of the rotary disc 16, and the teeth 13 and 17 exert shear force on the pulp sheet, thereby disintegrating the pulp sheet. Consequently, a large number of small pulp pieces are produced. Owing to the centrifugal force, the large number of pulp pieces are led outwardly in the radial direction from between the fixed disc 12 and the rotary disc 16, and discharged to the outside of the casing 11 through the outlet 11d.

The disc refiner 10 is set such that the pulp sheet is disintegrated into pulp pieces having an average area of not more than 45 cm$^2$. Specifically, the average area of the pulp pieces to be produced can be set to a desirable value by adjusting, for example, the clearance L between the teeth 13 and the teeth 17 facing each other and the rotation speed of the rotary shaft 14. It should be noted that when the pulp sheet is subjected to the primary disintegration, it is not necessary to add water to the pulp sheet in advance of the primary disintegration. In the primary disintegration, not a disc refiner but a different mechanical disintegrator (e.g., a hammer mill) may be used instead.

Next, the pulp that has undergone the primary disintegration is further disintegrated by the jet mill 20 (secondary disintegration). Specifically, while the rotary shaft 23 is being driven to rotate, the large number of pulp pieces having an average area of not more than 45 cm$^2$ are sequentially fed into the inlet 21d of the jet mill 20. Then, the pulp pieces that have been led to the rotor housing 21b through the introducing part 21a are led outwardly in the radial direction owing to a swirl flow accelerated by the vanes 27a of the distributor 27, and circumferentially evenly distributed to a gap (a milling chamber) formed between the rotors 25 and the liner 22. The pulp pieces are exposed to impact shocks that are caused by: hitting by the blades 25a; collision with the liner 22; and high-frequency pressure oscillation generated as a result of the action of the high-speed rotating blades 25a, the partition plates 26, and the liner 22. Consequently, the pulp pieces are finely disintegrated. Then, the resulting fine powdery pulp that has been led from the rotor housing 21b to the leading-out part 21c is discharged to the outside of the casing 21 through the outlet 21e.

Next, the disintegrated raw material pulp obtained through the above-described primary disintegration and secondary disintegration is used to produce cellulose acetate. The cellulose acetate is produced through known production steps. To be specific, first, a pretreatment is performed, in which acetic acid is added to the raw material pulp. The acetic acid to be added in the pretreatment may contain a sulfuric acid catalyst or may contain no sulfuric acid catalyst. Next, acetic acid that has been cooled down, acetic anhydride, and a sulfuric acid catalyst (mixed acid) are added to the pretreated pulp, and the resulting mixture is subjected to acetylation by using a kneader while controlling the temperature of the mixture by an external jacket or the like. After fully-trisubstituted cellulose acetate (primary cellulose acetate) is obtained by the acetylation, the obtained viscous cellulose acetate is charged into an ageing tank, and a neutralizer such as an aqueous solution of magnesium acetate is added thereto, such that the sulfuric acid is neutralized (fully or partly neutralized) by magnesium, and such that the acetic anhydride is quenched and hydrolyzed by water contained in the aqueous solution of magnesium acetate. Consequently, a cellulose acetate (secondary cellulose acetate) dope with a desirable degree of substitution is obtained. A large amount of water is added to the dope, or the dope is extruded into a large amount of water, such that the cellulose acetate is sedimented in the water. The cellulose acetate sediment is then subjected to solid-liquid separation, washed, and dried. As a result, a cellulose acetate product is obtained.

EXAMPLES

Hereinafter, Examples are given for describing the present invention more specifically.

Examples 1 to 5 and Comparative Examples 1 to 9

In Examples 1 to 5 and Comparative Examples 1 to 9, a pulp sheet was disintegrated under the conditions shown in Table 1, and cellulose acetate was produced by using the disintegrated pulp as a raw material.

In the primary disintegration in Examples 1, 2, and 5 and Comparative Examples 1 to 4, a disc refiner to which discs with pyramid-shaped teeth (the discs having a maximum inclination angle average value of 20.1 degrees and a maximum static frictional coefficient of 0.35) were attached with the clearance set to 3 mm (a disc refiner equipped with CR-30 refiner plates 887 and 888; manufactured by AIKAWA Iron Works Co., Ltd.) was used to perform the disintegration treatment at 1400 r/min. In the primary disintegration in Examples 3 and 4 and Comparative Examples 5 to 9, a large number of pulp pieces having a predetermined average area were manually prepared.

In the secondary disintegration in Examples 1 to 5 and Comparative Examples 5 to 7, a turbo mill (T600) manufactured by Freund-Turbo Corporation was used as a jet mill. In the secondary disintegration in Comparative Examples 8 and 9, a turbo mill (T400) manufactured by Freund-Turbo Corporation was used as a jet mill. In both the secondary disintegration using the turbo mill (T600) and the secondary disintegration using the turbo mill (T400), the disintegration treatment was performed at 1750 r/min. In the secondary disintegration in Comparative Examples 2 and 4, a disc refiner to which discs with linear teeth (D2A505 manufactured by Durametal Corporation; the discs having a maximum inclination angle average value of 32.1 degrees and a maximum static frictional coefficient of 0.56) were attached with the clearance set to 3.8 mm (a disc refiner for test use, Nuncy Penna 17756 Size 105-A (Sprout, Waldron & Co.)) was used to perform the disintegration treatment at 3600 r/min. In Comparative Examples 1 and 3, only the primary disintegration was performed, and no secondary disintegration was performed.

It should be noted that "Proportion of Undisintegrated Pulp" means as follows. When the pulp that has undergone the disintegration is classified by air-jet sieving, there are pulp pieces that cannot pass through a 4-mesh sieve (opening size of 4.76 mm) (i.e., pulp pieces inferior in terms of, for example, acetylation reactivity during the cellulose acetate production). The proportion (% by weight) of such pulp pieces to the entire amount of the pulp is referred to as "Proportion of Undisintegrated Pulp".

In Examples 1 to 4 and Comparative Examples 1 to 9, the disintegrated pulp was used as a raw material for producing cellulose acetate by a production method according to either SYNTHESIS EXAMPLE 1 or SYNTHESIS EXAMPLE 2.

Synthesis Example 1

As a pretreatment, 100 parts of glacial acetic acid was evenly sprayed over 100 parts of pulp previously humidified to contain 5% of water, and the resulting pulp was left as it was for one hour at room temperature. Thereafter, as an acetylation treatment, the pulp was mixed into a liquid mixture previously cooled down to 12° C., the liquid mixture containing 250 parts of acetic anhydride, 375 parts of acetic acid, and 1 part of sulfuric acid; then the temperature was increased to 57° C. by taking 60 minutes; thereafter, the mixture was cooled down to 50° C. in 10 minutes; and subsequently, the mixture was kept at 50° C. for 10 minutes, which was a necessary time for obtaining an intended polymerization degree. Next, 10 parts of a 24% aqueous solution of magnesium acetate was added and mixed to neutralize the sulfuric acid. The reaction mixture was transferred into an autoclave, which was then sealed. While the mixture was being stirred in the sealed autoclave, superheated water was passed through the jacket of the autoclave, and thereby the temperature was increased to 150° C. by taking 90 minutes. Then, the temperature was kept at 150° C. for 50 minutes. Thereafter, the mixture was taken out of the autoclave little by little through a nozzle and allowed to cool down under atmospheric pressure. The cellulose acetate solution that had thus cooled down was, while being stirred by a mixer, fed into 10% diluted acetic acid, which was three times as great in amount as the cellulose acetate solution. As a result, flaky sediment was obtained. The sediment was washed with a sufficient amount of running water, and dried in an oven at 100° C. for two hours. In this manner, cellulose acetate was obtained.

Synthesis Example 2

Pulp containing 5% of water was fed into a pretreatment machine, in which 100 parts of glacial acetic acid was evenly sprayed over 100 parts of the pulp, and the resulting pulp was mixed at 40° C. for 30 minutes. In this manner, pretreatment activation was performed. A liquid mixture containing 250 parts of acetic anhydride, 375 parts of acetic acid, and 1 part of sulfuric acid and cooled down to 12° C. was prepared in a kneading acetylator in advance. Then, the pulp previously subjected to the aforementioned pretreatment activation was fed into the kneading acetylator, and stirred and mixed therein. The mixture generated heat as a result of a reaction between water entrained by the raw material pulp and the acetic anhydride and a reaction between cellulose and the acetic anhydride. The temperature was controlled by external cooling, such that the temperature increased to 77° C. from the initial temperature of about 16° C. by taking 60 minutes. Then, the temperature was kept at 77° C. for 12 minutes to cause an acetylation reaction. Next, 10 parts of a 20% aqueous solution of magnesium acetate was added and mixed to fully neutralize the sulfuric acid in the system and to leave excess magnesium acetate. The fully neutralized reaction mixture was transferred into an autoclave, which was then sealed. Steam of a gauge pressure of 5 kg/cm$^2$ was blown into the sealed autoclave while the mixture was being stirred therein, and the temperature was increased to 150° C. by taking about 60 minutes. After the temperature was kept at 150° C. for 50 minutes, the reaction product was gradually flashed in the atmosphere to decrease the temperature of the reaction mixture to 100° C. An aqueous solution of diluted acetic acid was added to the reaction mixture under intense stirring, and resulting flaky cellulose acetate was separated, which was then washed with water sufficiently, taken out, and dried.

The degree of filtration and fiber amount of each cellulose acetate were measured.

The physical properties of each cellulose acetate were measured by methods described below.

(1) Degree of Filtration (Kw)

Each cellulose acetate was dissolved in a 96% aqueous acetone solution such that the cellulose acetate concentration therein was 20%. The resulting cellulose acetate solution was passed through a predetermined filter cloth (effective area: 1.77 cm$^2$) at 50° C. The degree of filtration (Kw) was calculated by using Equation 1 shown below. In Equation 1, P1 is the amount of filtrate (ml) accumulated over a period of 20 minutes since the start of the filtration, and P2 is the amount of filtrate (ml) accumulated over a period of 40 minutes from when 20 minutes elapsed since the start of the filtration to when 60 minutes elapsed since the start of the filtration.

$$Kw=\{(2-P2/P1)/(P1+P2)\}\cdot 10^4 \quad \text{[Equation 1]}$$

The meaning of "the degree of filtration" in terms of physical properties is the degree of clogging of the predetermined filter cloth. That is, the degree of filtration indicates the amount of insoluble components of the cellulose acetate in the acetone solution. Cellulose acetate with a high degree of filtration is considered to contain a large amount of insoluble components, such as unreacted fibers and gel. Therefore, if cellulose acetate with a high degree of filtration is used, the amount of clogging is large in a filtration process prior to film forming. Thus, the filterability of such cellulose acetate is considered to be poor.

(2) Fiber Amount

Dichloromethane/methanol (weight ratio 9:1) was added to 3 to 5 g of a dry cellulose acetate sample to obtain a mixture having a total amount of 150 g. The mixture was stirred by a stirrer for three hours or more. A membrane filter (Millipore JC 10 μm) was dried by a vacuum dryer at 50° C. for three hours, and then weighed. The aforementioned cellulose acetate solution was filtered by the resulting membrane filter, and the filtration residue was washed three times or more, in each of which the filtration residue was washed with 50 ml of dichloromethane/methanol (weight ratio 9:1). The membrane filter on which the resulting filtration residue was placed was dried by a vacuum dryer at 50° C. for three hours, then allowed to cool down in a desiccator, and thereafter weighed. The proportion (% by weight) of an increase in the weight to the weight of the cellulose acetate sample was calculated as a fiber amount. The fiber amount indicates the ratio of insoluble components in the cellulose acetate to dichloromethane/methanol (the weight ratio of the dichloromethane/methanol was 9:1). Part of the insoluble components is the raw material cellulose whose reaction has not been completed. The fiber amount of cellulose acetate shows a positive correlation with the degree of filtration of cellulose acetate obtained from the same kind of pulp. The fiber amount is used as a surrogate indicator of quality.

(3) Acetylation Degree

The acetylation degree of each cellulose acetate was measured in accordance with an acetylation degree measuring method prescribed in ASTM: D-817-91 (testing methods for cellulose acetate, etc.). First, 1.9 g of dry cellulose acetate was precisely weighed and dissolved in 150 ml of a mixed solvent of acetone and dimethyl sulfoxide (volume ratio 4:1). Then, 30 ml of a 1N-sodium hydroxide aqueous solution was added thereto, and the resulting mixture was saponified at 25° C. for two hours. Next, a phenolphthalein about 30 minutes. The flow time required to pass between time-marker lines was measured, and the 6% viscosity was calculated by using Equation 3 shown below.

$$\text{6\% viscosity (mPa·s)} = \text{flow time (s)} \cdot \text{viscometer coefficient} \quad \text{[Equation 3]}$$

It should be noted that the viscometer coefficient was determined in the following manner: the flow time of a standard solution for viscometer calibration was measured in the same manner as described above; and the viscometer coefficient was calculated by using Equation 4 shown below. In Equation 4, V is the absolute viscosity of the standard solution (mPa·s); D1 is the density of the solution (1.235 g/cm); D2 is the density of the standard solution (g/cm$^3$); and T is the flow time of the standard solution in seconds (s).

$$\text{Viscometer coefficient} = (V \cdot D1)/(D2 \cdot T) \quad \text{[Equation 4]}$$

TABLE 1

| | | Examples | | | | | Comparative Examples | | | | | | | | |
|---|---|---|---|---|---|---|---|---|---|---|---|---|---|---|---|
| | | 1 | 2 | 3 | 4 | 5 | 1 | 2 | 3 | 4 | 5 | 6 | 7 | 8 | 9 |
| Pulp Pieces | Tree Type | Coniferous | | | | Broad-leaved | Broad-leaved | | | | Coniferous | | | | |
| | Digestion Method | | | | | | | Sulfite | | | | | | | |
| | Purity [%] (α-cellulose content) | 95.8 | | | | 95.3 | 95.3 | | | | 95.8 | | | | 92.3 |
| | Sheet Density [g/cm3] | 0.50 | | | | 0.46 | 0.46 | | | | 0.50 | | | | 0.87 |
| | Weighted Average Fiber Length [mm] | 2.6 | | | | 0.6 | 0.6 | | | | 2.6 | | | | 2.9 |
| | Average Area [cm2] | 0.25 | 16 | 40 | | 0.25 | 0.25 | | | | 52 | 100 | | 200 | |
| Disintegrator | Primary Disintegration | Disc Refiner (Pyramid teeth) | — | (Manually done) | | Disc Refiner mid teeth) | Disc Refiner (Pyramid teeth) | | | | — | (Manually done) (Pyra- | | | |
| | Secondary Disintegration | Turbo Mill T600 | | | | | Not Done | Disc Refiner (Linear teeth) | Not Done | Disc Refiner (Linear teeth) | Turbo Mill T600 | | | Turbo Mill T400 | |
| Production Data | Proportion of Undisintegrated Pulp [wt %] | | 8 | | | 0 | 51 | 0 | 54 | 0 | | | 8 | | |
| | Synthesis Method | 1 | | 2 | | 1 | | 1 | | | | | 2 | | |
| | Acetylation Degree [%] | 55.5 | 55.5 | 55.3 | 55.4 | 55.5 | 55.5 | 55.5 | 55.5 | 55.4 | 55.3 | 55.4 | 55.5 | 55.5 | 55.5 |
| | 6% Viscosity [mPa · s] | 74 | 69 | 70 | 67 | 71 | 73 | 70 | 72 | 75 | 65 | 67 | 69 | 69 | 66 |
| | Degree of Filtration | 58 | 58 | 60 | 58 | 80 | 658 | 223 | 132 | 357 | 82 | 95 | 96 | 100 | 108 |
| | Fiber Amount [wt %] | 0.01 | 0.01 | 0.01 | 0.01 | 0.01 | 0.16 | 0.04 | 0.07 | 0.25 | 0.03 | 0.05 | 0.05 | 0.05 | 0.05 | solution was added as an indicator, and the excess sodium hydroxide was titrated with 1N-sulfuric acid. Then, the acetylation degree (%) was calculated by using Equation 2 shown below. In Equation 2, A is the volume (ml) of 1N-sulfuric acid required for the titration of the sample; B is the volume (ml) of 1N-sulfuric acid required for the titration of a blank test; F is the concentration factor of 1N-sulfuric acid; and W is the weight of the sample.

$$\text{Acetylation degree (\%)} = \{6.005 \times (B-A) \times F\}/W \quad \text{[Equation 2]}$$

(4) 6% Viscosity

In an Erlenmeyer flask, 6.0 g of a dry sample and 94.0 ml of a mixed solvent of methylene chloride/methanol=91/9 (weight ratio) were placed. The flask was sealed and stirred for about one hour. Then, the sample was completely dissolved by shaking the flask for about one hour with a rotary shaker. The resulting 6 wt/vol % solution was transferred into a predetermined Ostwald viscometer up to its marked line, and the temperature was controlled to be 25±1° C. for It is understood from Table 1 that, in Examples 1 to 5, the values of the degree of filtration and fiber amount were reduced compared to Comparative Examples 1 to 9. That is, high-quality cellulose acetate with favorable filterability and reduced unreacted components was obtained in Examples 1 to 5. The reason for this is considered that, in Examples 1 to 5, since the pulp was disintegrated in the secondary disintegration by utilizing the impact shocks exerted by the jet mill, degradation of the pulp due to heat was suppressed while preventing the pulp from being left undisintegrated. It should be noted that the degree of filtration in Example 5 was slightly higher than the degree of filtration in Examples 1 to 4. The reason for this is that, in the case of the coniferous tree in Examples 1 to 4, the degree of filtration thereof was sufficiently reduced by the turbo mill since the degree of filtration of coniferous trees is basically low; meanwhile, in the case of the broad-leaved tree in Example 5, the degree of filtration thereof was reduced to an acceptable level by the turbo mill although the degree of filtration of broad-leaved trees is basically high. That is, according to Example 5, it can be considered that high-quality cellulose acetate with reduced unreacted components can be obtained even from broad-leaved trees, the degree of filtration of which is basically high.

In addition, in Examples 1 to 4, the weighted average fiber length of the pulp sheet was 2.6 mm, which was long; however, the degree of filtration and the fiber amount were sufficiently reduced. The reason for this is considered that even in the case of using a pulp sheet with a long fiber length, such as one having a weighted average fiber length of 2.0 mm or more, the jet mill made it possible to prevent scorching of the pulp during the secondary disintegration. It should be noted that the weighted average fiber length of the pulp sheet is preferably not more than 10 mm from the viewpoint of disintegrability.

Hereinafter, an influence of the size of pulp pieces fed into the jet mill on the cellulose acetate production is discussed.

Figure 3:
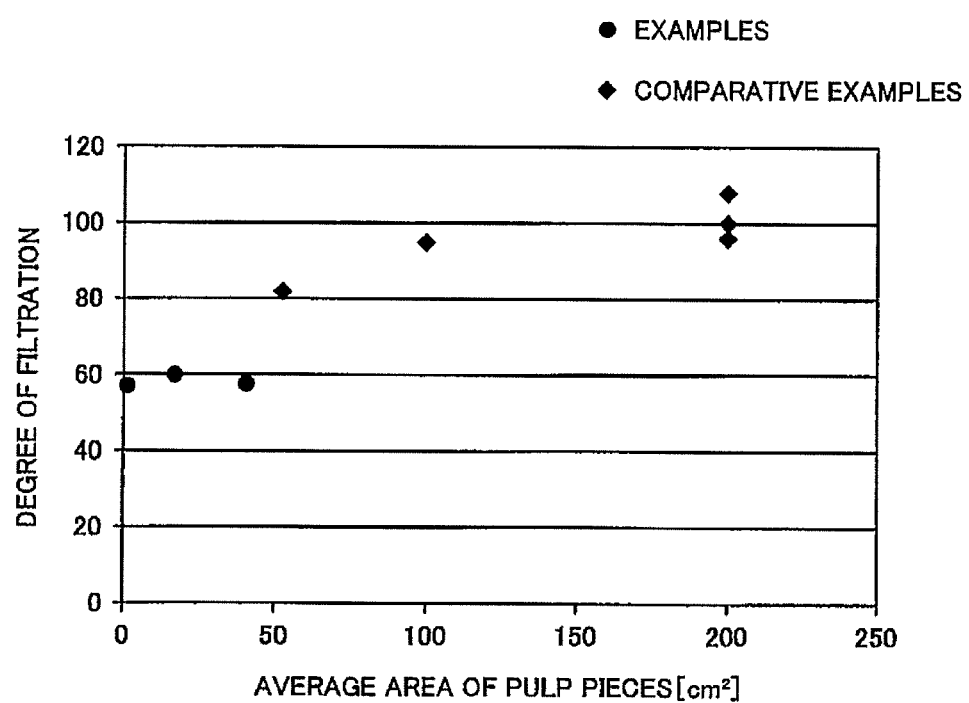
FIG. 3 is a chart showing a relationship between the average area of pulp pieces and the degree of filtration in each of Examples 1 to 4 and each of Comparative Examples 5 to 9.

FIG. 3 is a chart showing a relationship between the average area of pulp pieces and the degree of filtration in each of Examples 1 to 4 and each of Comparative Examples 5 to 9. It is understood from Table 1 and FIG. 3 that, in Examples 1 to 4, the value of the degree of filtration (as well as the value of the fiber amount) was sufficiently reduced compared to Comparative Examples 5 to 9. That is, in Examples 1 to 4, high-quality cellulose acetate with favorable filterability and reduced unreacted components was obtained. The reason for this is considered that, in Examples 1 to 4, since the average area of the pulp pieces fed into the jet mill was not more than 45 $cm^2$, problems such as uneven distribution of the pulp within the jet mill were prevented satisfactorily, and thereby the pulp was disintegrated evenly. It is understood from Table 1 that, also in Example 5, the degree of filtration was reduced satisfactorily although a broad-leaved tree was used as a raw material.

The upper limit value of the average area of the pulp pieces fed into the jet mill after undergoing the primary disintegration is preferably 40 $cm^2$, more preferably 16 $cm^2$, and even more preferably 5 $cm^2$. The reason for this is that, as shown in Table 1, when the average area of the pulp pieces is reduced, the degree of filtration is reduced sufficiently. The disintegrability is not particularly affected so long as the average area of the pulp pieces fed into the jet mill after undergoing the primary disintegration is reduced. However, the lower limit value of the average area of the pulp pieces at the time is preferably 0.01 $cm^2$, more preferably 0.1 $cm^2$, and even more preferably 2 $cm^2$. The reason for this is as follows. Even if the pulp pieces fed into the jet mill have a relatively large average area, favorable results are still obtained (as shown in Table 1), and by increasing the lower limit value of the average area of the pulp pieces, the following advantages are obtained: generation of heat in the primary disintegration can be suppressed; and the treatment time of the primary disintegration can be reduced.

INDUSTRIAL APPLICABILITY

As described above, the method of disintegrating pulp for use in cellulose acetate production and the method of producing cellulose acetate according to the present invention provide an excellent advantage of being able to obtain high-quality cellulose acetate with reduced unreacted components, and are beneficial when widely applied to cellulose acetate production in which the aforementioned advantage can be exerted meaningfully.

REFERENCE SIGNS LIST

10 disc refiner
20 jet mill
21 casing
21*d* inlet
21*e* outlet
25 rotor
25*a* blade

The invention claimed is:

1. A method of producing cellulose acetate, comprising a disintegration step including:
   a primary disintegration step of disintegrating a pulp sheet, to which water has not been added, into pulp pieces having an average area of not more than 45 $cm^2$ by a disc refiner or a hammer mill; and
   a secondary disintegration step of disintegrating the pulp pieces with an impact shock exerted by a jet mill, wherein the jet mill includes a cylindrical casing provided with an inlet and an outlet and a rotor including a plurality of blades provided on its outer peripheral portion, the plurality of blades facing an inner peripheral surface of the casing;
   a pretreatment step of performing a pretreatment of adding acetic acid to pulp that has been disintegrated by the disintegration step; and
   an acetylation step of adding acetic acid, acetic anhydride, and a sulfuric acid catalyst to the pulp that has undergone the pretreatment step, and subjecting a resulting mixture to acetylation while controlling a temperature of the mixture;
   wherein the cellulose acetate has a lower proportion of matter insoluble in a 96% aqueous acetone at 50° C. when compared to a cellulose acetate produced by an otherwise identical method wherein the secondary disintegration is carried out by a disc refiner.

2. A method of producing cellulose acetate, consisting essentially of a disintegration step including:
   a primary disintegration step of disintegrating a pulp sheet, to which water has not been added, into pulp pieces having an average area of not more than 45 $cm^2$ by a disc refiner or a hammer mill; and
   a secondary disintegration step of disintegrating the pulp pieces with an impact shock exerted by a jet mill, wherein the jet mill includes a cylindrical casing provided with an inlet and an outlet and a rotor including a plurality of blades provided on its outer peripheral portion, the plurality of blades facing an inner peripheral surface of the casing;
   a pretreatment step of performing a pretreatment of adding acetic acid to pulp that has been disintegrated by the disintegration step; and
   an acetylation step of adding acetic acid, acetic anhydride, and a sulfuric acid catalyst to the pulp that has undergone the pretreatment step, and subjecting a resulting mixture to acetylation while controlling a temperature of the mixture.

* * * * *